(12) United States Patent
Hirono

(10) Patent No.: US 8,664,906 B2
(45) Date of Patent: Mar. 4, 2014

(54) MOTOR CONTROL DEVICE

(75) Inventor: Daisuke Hirono, Isesaki (JP)

(73) Assignee: Sanden Corporation, Isesaki-shi (JP)

( * ) Notice: Subject to any disclaimer, the term of this patent is extended or adjusted under 35 U.S.C. 154(b) by 0 days.

(21) Appl. No.: 13/377,870

(22) PCT Filed: Jun. 16, 2010

(86) PCT No.: PCT/JP2010/003982
§ 371 (c)(1),
(2), (4) Date: Dec. 13, 2011

(87) PCT Pub. No.: WO2010/150485
PCT Pub. Date: Dec. 29, 2010

(65) Prior Publication Data
US 2012/0086375 A1    Apr. 12, 2012

(30) Foreign Application Priority Data

Jun. 25, 2009  (JP) .................................. 2009-150933

(51) Int. Cl.
*H02P 6/18*    (2006.01)
(52) U.S. Cl.
USPC .................................................... 318/400.34
(58) Field of Classification Search
None
See application file for complete search history.

(56) References Cited

U.S. PATENT DOCUMENTS

2004/0263104 A1*  12/2004  Iwanaga et al. ............... 318/439
2010/0225262 A1*  9/2010  Matsuo et al. ............ 318/400.33

FOREIGN PATENT DOCUMENTS

| JP | 08-308286 | 11/1996 |
| JP | 2000-278987 | 10/2000 |
| JP | 2001-161090 | 6/2001 |
| JP | 2004-187407 | 7/2004 |

OTHER PUBLICATIONS

International Search Report issued in PCT/JP2010/003982 mailed Oct. 12, 2010.

* cited by examiner

*Primary Examiner* — Lincoln Donovan
*Assistant Examiner* — Zoheb Imtiaz
(74) *Attorney, Agent, or Firm* — Greer Burns & Crain Ltd.

(57) ABSTRACT

Problems to be Solved

To provide is a motor control device capable of detecting a rotor position of a synchronous motor under a certain accuracy and a low processing load.

Means for Solving the Problems

The motor control device detects the rotor position θm by directly finding a rotor position θm from a rotor position expression (θm=θi−β−90°) containing, as a variable, a current electrical angle θi from among a phase current peak value Ip and a phase current electrical angle θi detected in a phase current peak value and electrical angle detection unit 19 and an induced voltage peak value Ep and an induced voltage electrical angle θe detected in an induced voltage peak value and electrical angle detection unit 20, and containing, as a variable, a current phase β capable of being selected using [a phase current peak value Ip] and [an induced voltage electrical angle θe−a phase current electrical angle θi] as parameters from a predefined data table.

5 Claims, 3 Drawing Sheets

MOTOR CONTROL DEVICE

This application is a U.S. National Phase under 35 U.S.C. §371 of International Application No. PCT/JP2010/003982, filed Jun. 16, 2010.

TECHNICAL FIELD

The present invention relates to a motor control device having a function of detecting a rotor rotational position (hereinafter referred to as a rotor position) of a synchronous motor without a sensor.

BACKGROUND ART

In a sine-wave driving mode (180-degree conduction mode) known as a driving mode for a synchronous motor such as a three-phase DC brushless motor, a rotor position is detected without a sensor in order to appropriately carry out a conduction to a stator coil without a sensor.

Patent Literature 1 discloses a rotor position detection method in which a first phase difference between a motor current and an actual rotational position is found and a second phase difference between a motor current and a virtual rotational position is found; and a phase error between the actual rotational position and the virtual rotational position is estimated on the basis of the difference between the first phase difference and the second phase difference; and a voltage frequency is corrected so that the phase error reaches zero.

Patent Literature 2 discloses a rotor position detection method in which a rotational angular velocity, a d-axis current, and a γ-axis current of a synchronous motor are found; and an estimated rotation angle is fond on the assumption that an angular deviation between an actual rotation angle of a rotor and a rotation angle estimated based on a rotation model is proportional to a current deviation between the d-axis current and the γ-axis current.

The rotor position detection methods disclosed in Patent Literatures 1 and 2 basically detect a desired rotor position by correcting a virtual rotor position under predetermined conditions. Therefore, the rotor position detection accuracy varies depending on the correction accuracy. Further, the rotor position detection methods require repeating a process of finding the virtual rotor position and then correcting the rotor position at high speeds. Therefore, a high performance data processing apparatus corresponding to a high processing load is needed.

PRIOR ART LITERATURE

Patent Literature

Patent Literature 1: Japanese Patent Publication 2001-161090
Patent Literature 2: Japanese Patent Publication H8-308286

SUMMARY OF THE INVENTION

Problems to be Solved by the Invention

An object of the present invention is to provide a motor control device capable of detecting a rotor position of a synchronous motor under a certain accuracy and a low processing load.

Means for Solving the Problems

In order to achieve the above object, a motor control device based on the present invention having a function of detecting a rotor position of a synchronous motor without a sensor, wherein the motor control device comprises: current detecting means for detecting a current flowing through a coil of the synchronous motor; applied voltage detecting means for detecting an applied voltage applied to the coil of the synchronous motor; current peak value and electrical angle detecting means for detecting a current peak value and a current electrical angle on the basis of the current detected in the current detecting means; induced voltage peak value and electrical angle detecting means for detecting an induced voltage peak value and an induced voltage electrical angle on the basis of the current detected in the current detecting means and the applied voltage detected in the applied voltage detecting means; and rotor position detecting means for detecting the rotor position by directly finding the rotor position from a rotor position expression containing, as a variable, the current electrical angle or the induced voltage electrical angle from among the current peak value and the current electrical angle detected in the current peak value and electrical angle detecting means and the induced voltage peak value and the induced voltage electrical angle detected in the induced voltage peak value and electrical angle detecting means, and containing, as a variable, a current phase or an induced voltage phase capable of being selected using at least two of [the current peak value], [the induced voltage peak value] and [the induced voltage electrical angle–the current electrical angle] as parameters from a predefined data table.

According to the motor control device can detect the rotor position by directly finding the rotor position from the rotor position expression containing, as the variable, the current electrical angle or the induced voltage electrical angle from among the current peak value and the current electrical angle detected in the current peak value and electrical angle detecting means and the induced voltage peak value and the induced voltage electrical angle detected in the induced voltage peak value and electrical angle detecting means, and containing, as the variable, the current phase or the induced voltage phase capable of being selected using at least two of [the current peak value], [the induced voltage peak value] and [the induced voltage electrical angle–the current electrical angle] as parameters from the predefined data table.

Briefly, the rotor position is directly found by the use of the predetermined rotor position expression. Thus, the rotor position can be reliably detected under a certain accuracy contrary to the conventional detection method involving variation in detection accuracy. In addition, the use of a system for selecting the current phase or the induced voltage phase which is one of the variables contained in the rotor expression from the predefined data table. Thus, the rotor position can be simply detected under a lower processing load than the system for finding the current phase or the induced voltage phase every time, there is no need to use a high performance data processing apparatus corresponding to a high processing load that used in the conventional detection method.

Advantageous Effects of the Invention

The present invention can provide a motor control device capable of detecting a rotor position of a synchronous motor under a certain accuracy and a low processing load.

The object and other objects, constitutional features, functions, and effects of the present invention will be clarified from the following description and the attached drawings.

EMBODIMENTS FOR CARRYING THE INVENTION

Figure 1:
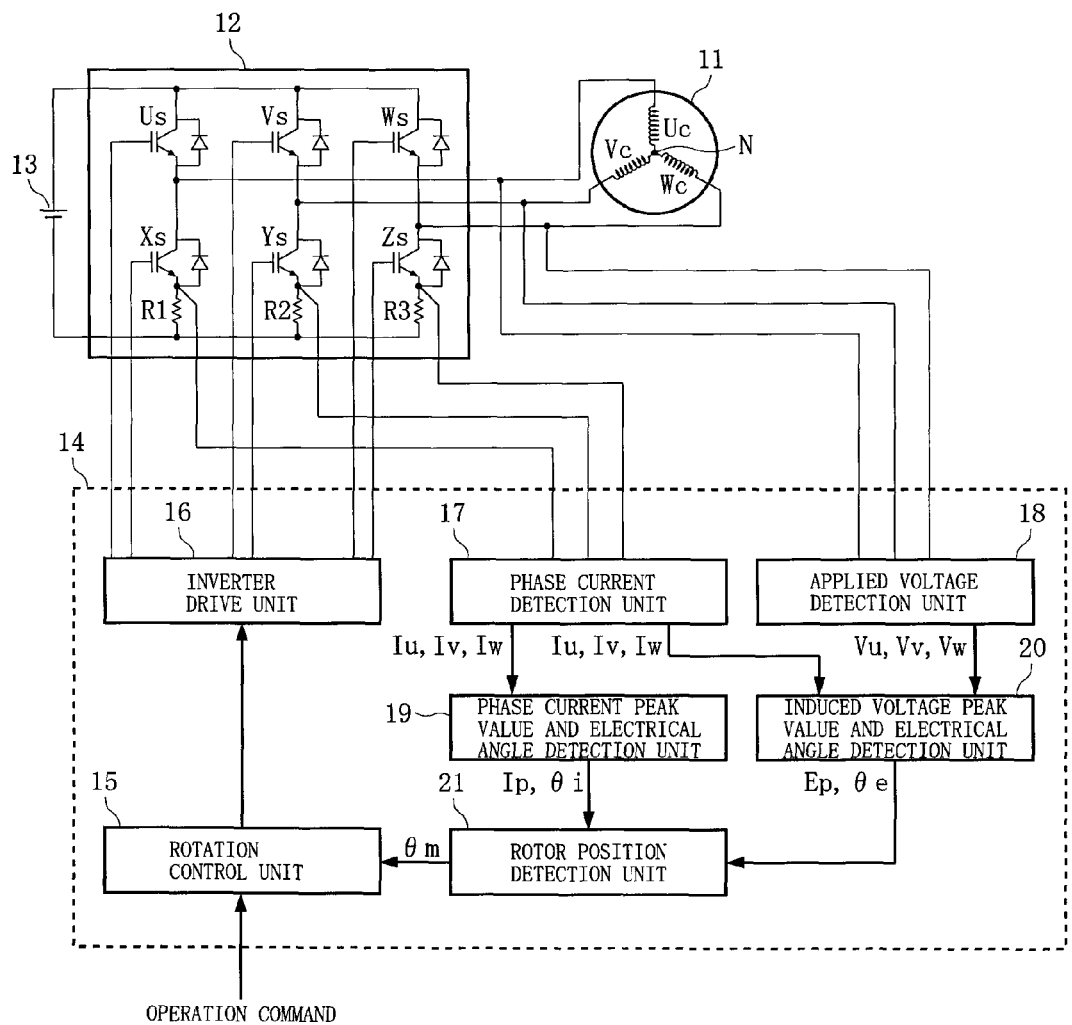
FIG. 1 is a block diagram of a motor control device to which the present invention is applied.

FIG. 1 illustrates a motor control device to which the present invention is applied. In the figure, reference numeral 11 denotes a synchronous motor, reference numeral 12 denotes an inverter, reference numeral 13 denotes a direct current power source, and reference numeral 14 denotes a controller having a microcomputer therein. The controller 14 includes a rotation control unit 15, an inverter drive unit 16, a phase current detection unit 17, an applied voltage detection unit 18, a phase current peak value and electrical angle detection unit 19, an induced voltage peak value and electrical angle detection unit 20, and a rotor position detection unit 21.

The synchronous motor 11 is a three-phase DC brushless motor which includes a stator (unillustrated) having three-phase coils (a U-phase coil Uc, a V-phase coil Vc, and a W-phase coil Wc) and a rotor (unillustrated) having a permanent magnet. The U-phase coil Uc, the V-phase coil Vc, and the W-phase coil Wc are connected in a star connection around a neutral point N as illustrated in the figure or a delta connection.

The inverter 12 is a three-phase bipolar drive inverter which includes three-phase switching devices corresponding to the three-phase coils of the synchronous motor 11, specifically, six switching devices (upper phase switching devices Us, Vs, and Ws, and lower phase switching devices Xs, Ys, and Zs) each made of an insulated gate bipolar transistor (IGBT) or the like, and shunt resistors R1, R2, and R3. Each of the shunt resistors R1, R2, and R3 serves as a sensor for detecting a current flowing through each phase of the synchronous motor 11.

The upper phase switching device Us, the lower phase switching device Xs, and the shunt resistor R1 are connected in series, each end of which is connected to the direct current power source 13. The upper phase switching device Vs, and the lower phase switching device Ys, and the shunt resistor R2 are connected in series, each end of which is connected to the direct current power source 13. The upper phase switching device Ws, the lower phase switching device Zs, and the shunt resistor R3 are connected in series, each end of which is connected to the direct current power source 13.

Further, the emitter side of the upper phase switching device Us is connected to the U-phase coil Uc of the synchronous motor 11. The emitter side of the upper phase switching device Vs is connected to the V-phase coil Vc of the synchronous motor 11. The emitter side of the upper phase switching device Ws is connected to the W-phase coil We of the synchronous motor 11. Branch lines from each of the connection lines are connected to the applied voltage detection unit 18.

Further, gates of the upper phase switching devices Us, Vs, and Ws and gates of the lower phase switching devices Xs, Ys, and Zs are respectively connected to the inverter drive unit 16. Furthermore, the lower phase switching device Xs side of the shunt resistor R1, the lower phase switching device Ys side of the shunt resistor R2, and the lower phase switching device Zs side of the shunt resistor R3 are respectively connected to the phase current detection unit 17.

The rotation control unit 15 sends a control signal for rotating the synchronous motor 11 at a predetermined rotational frequency or stopping the synchronous motor 11 to the inverter drive unit 16 on the basis of an operation command from an operation unit (unillustrated) and a rotor position θm detected in the rotor position detection unit 21.

The inverter drive unit 16 sends a drive signal for turning on or off each of the switching devices to each gate of the upper phase switching devices Us, Vs, and Ws of the inverter 12 and each gate of the lower phase switching devices Xs, Ys, and Zs thereof on the basis of the control signal from the rotation control unit 15. The upper phase switching devices Us, Vs, and Ws and the lower phase switching devices Xs, Ys, and Zs of the inverter 12 are turned on or off in a predetermined pattern in accordance with the drive signal from the inverter drive unit 16, and carry out a sine-wave conduction (180-degree conduction) based on the on-off pattern to the U-phase coil Uc, the V-phase coil Vc, and the W-phase coil Wc of the synchronous motor 11.

The phase current detection unit 17 detects currents (a U-phase current Iu, a V-phase current Iv, and a W-phase current Iw) flowing through the U-phase coil Uc, the V-phase coil Vc, and the W-phase coil Wc of the synchronous motor 11 by the use of each voltage detected in the shunt resistors R1, R2, and R3 of the inverter 12, and sends the detected currents to the phase current peak value and electrical angle detection unit 19 and the induced voltage peak value and electrical angle detection unit 20.

The applied voltage detection unit 18 detects voltages (a U-phase applied voltage Vu, a V-phase applied voltage Vv, and a W-phase applied voltage Vw) applied to the U-phase coil Uc, the V-phase coil Vc, and the W-phase coil Wc of the synchronous motor 11, and sends the detected currents to the induced voltage peak value and electrical angle detection unit 20.

The phase current peak value and electrical angle detection unit 19 detects a phase current peak value Ip and a phase current electrical angle θi by the use of the U-phase current Iu, the V-phase current Iv, and the W-phase current Iw detected in the phase current detection unit 17, and sends the detected values to the rotor position detection unit 21. The method of detecting the phase current peak value Ip and the phase current electrical angle θi in the phase current peak value and electrical angle detection unit 19 will be described later in detail.

The induced voltage peak value and electrical angle detection unit 20 detects an induced voltage peak value Ep and an induced voltage electrical angle θe by the use of the U-phase current Iu, the V-phase current Iv, and the W-phase current Iw detected in the phase current detection unit 17 and the U-phase applied voltage Vu, the V-phase applied voltage Vv, and the W-phase applied voltage Vw detected in the applied voltage detection unit 18, and sends the detected values to the rotor position detection unit 21. The method of detecting the induced voltage peak value Ep and the induced voltage electrical angle θe in the induced voltage peak value and electrical angle detection unit 20 will be described later in detail.

The rotor position detection unit 21 detects a rotor position θm of the synchronous motor 11 and sends the position to the rotation control unit 15 by the use of the phase current peak value Ip and the phase current electrical angle θi detected in the phase current peak value and electrical angle detection unit 19 and the induced voltage peak value Ep and the induced voltage electrical angle θe detected in the induced voltage peak value and electrical angle detection unit 20. The method of detecting the rotor position θm in the rotor position detection unit 21 will be described later in detail.

Here, details about following methods are described in sequence: (1) the method of detecting the phase current peak value Ip and the phase current electrical angle θi in the phase current peak value and electrical angle detection unit 19; (2) the method of detecting the induced voltage peak value Ep and the induced voltage electrical angle θe in the induced voltage peak value and electrical angle detection unit 20; (3) the method of detecting the rotor position θm in the rotor position detection unit 21; and (4) the method of generating the data table used when detecting the rotor position θm in the rotor position detection unit 21.

(1) The Method of Detecting the Phase Current Peak Value Ip and the Phase Current Electrical Angle θi in the Phase Current Peak Value and Electrical Angle Detection Unit 19

Figure 2:
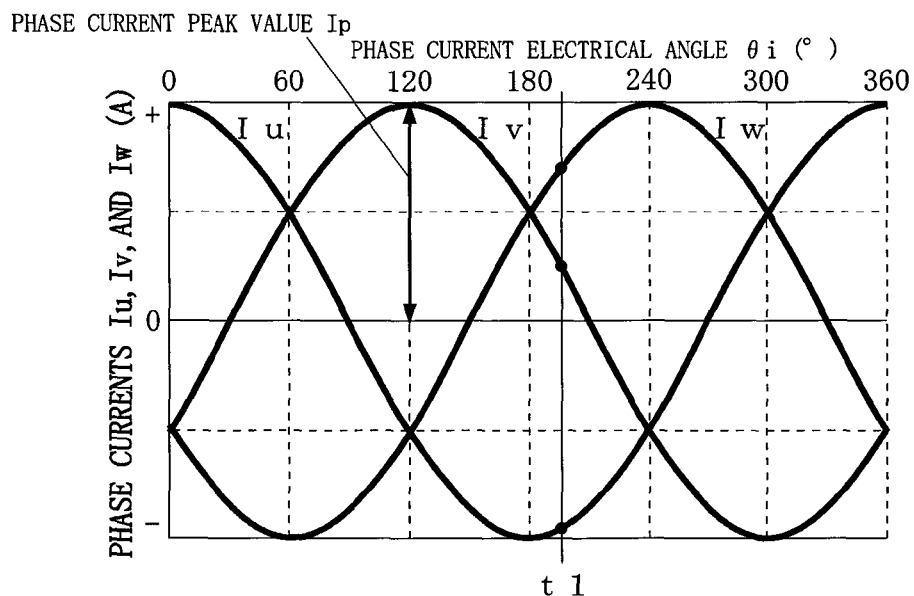
FIG. 2 is an explanatory drawing of a method of detecting a phase current peak value and a phase current electrical angle in a phase current peak value and electrical angle detection unit illustrated FIG. 1.

FIG. 2 is a diagram of phase current waveforms observed while a sine-wave conduction (180-degree conduction) is carried out to the U-phase coil Uc, the V-phase coil Vc, and the W-phase coil Wc of the synchronous motor 11. Each of the U-phase current Iu, the V-phase current Iv, and the W-phase current Iw has a sine-wave form with a phase difference of 120°.

In the phase current waveform diagram, the U-phase current Iu, the V-phase current Iv, and the W-phase current Iw, the phase current peak value Ip, and the phase current electrical angle θi satisfy the following expressions.

$$Iu = Ip \times \cos(\theta i)$$

$$Iv = Ip \times \cos(\theta i - \tfrac{2}{3}\pi)$$

$$Iw = Ip \times \cos(\theta i + \tfrac{2}{3}\pi)$$

The phase current peak value and electrical angle detection unit 19 detects the phase current peak value Ip and the phase current electrical angle θi on the assumption that the above expressions are satisfied. The detections of the phase current peak value Ip and the phase current electrical angle θi are carried out by finding the phase current peak value Ip and the phase current electrical angle θi from the above expressions by the use of the U-phase current Iu, the V-phase current Iv, and the W-phase current Iw detected in the phase current detection unit 17.

(2) The Method of Detecting the Induced Voltage Peak Value Ep and the Induced Voltage Electrical Angle θe in the Induced Voltage Peak Value and Electrical Angle Detection Unit 20

Figure 3:
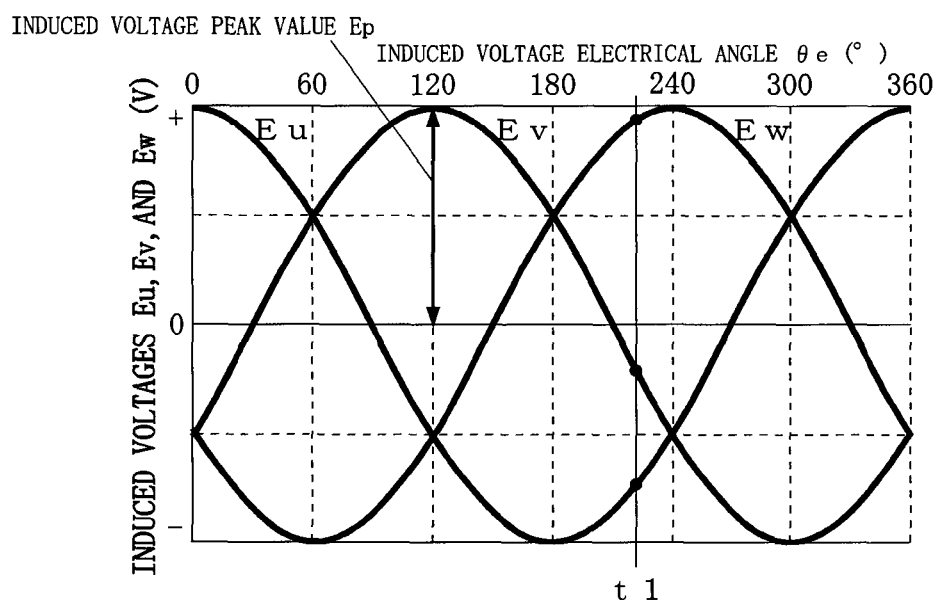
FIG. 3 is an explanatory drawing of a method of detecting an induced voltage peak value and an induced voltage electrical angle in an induced voltage peak value and electrical angle detection unit illustrated FIG. 1.

FIG. 3 is a diagram of induced voltage waveforms observed while a sine-wave conduction (180-degree conduction) is carried out to the U-phase coil Uc, the V-phase coil Vc, and the W-phase coil Wc of the synchronous motor 11. Each of the U-phase induced voltage Eu, the V-phase induced voltage Ev, and the W-phase induced voltage Ew has a sine-wave form with a phase difference of 120°.

In the induced voltage waveform diagram, the U-phase induced voltage Eu, the V-phase induced voltage Ev, and the W-phase induced voltage Ew, the induced voltage peak value Ep, and the induced voltage electrical angle θe satisfy the following expressions.

$$Eu = Ep \times \cos(\theta e)$$

$$Ev = Ep \times \cos(\theta e - \tfrac{2}{3}\pi)$$

$$Ew = Ep \times \cos(\theta e + \tfrac{2}{3}\pi)$$

Meanwhile, the U-phase applied voltage Vu, the V-phase applied voltage Vv, and the W-phase applied voltage Vw, the U-phase current Iu, the V-phase current Iv, and the W-phase current Iw, the U-phase coil resistance Ru, the V-phase coil resistance Rv, and the W-phase coil resistance Rw, the U-phase induced voltage Eu, the V-phase induced voltage Ev, and the W-phase induced voltage Ew satisfy the following expressions.

$$Vu - Iu \times Ru = Eu$$

$$Vv - Iv \times Rv = Ev$$

$$Vw - Iw \times Rw = Ew$$

The induced voltage peak value and electrical angle detection unit 20 detects the induced voltage peak value Ep and the induced voltage electrical angle θe on the assumption that the above expressions are satisfied. The detections of the induced voltage peak value Ep and the induced voltage electrical angle θe are carried out by finding the U-phase induced voltage Eu, the V-phase induced voltage Ev, and the W-phase induced voltage Ew from the above expressions (latter expressions) by the use of the U-phase current Iu, the V-phase current Iv, and the W-phase current Iw detected in the phase current detection unit 17 and the U-phase applied voltage Vu, the V-phase applied voltage Vv, and the W-phase applied voltage Vw detected in the applied voltage detection unit 18; and finding the induced voltage peak value Ep and the induced voltage electrical angle θe from the above expressions (former expressions) by the use of the U-phase induced voltage Eu, the V-phase induced voltage Ev, and the W-phase induced voltage Ew.

(3) The Method of Detecting the Rotor Position θm in the Rotor Position Detection Unit 21

The rotor position detection unit 21 detects the rotor position θm by finding the rotor position θm from the following expression by the use of the phase current electrical angle θi detected in the phase current peak value and electrical angle detection unit 19 and a current phase β selected from a predefined data table (see later described method in (4)).

$$\theta m = \theta i - \beta - 90°$$

The data table used here specifies the current phase β by [the phase current peak value Ip] and [the induced voltage electrical angle θe–the phase current electrical angle θi] as parameters. The desired current phase β can be selected using [the phase current peak value Ip] and [the induced voltage electrical angle θe–the phase current electrical angle θi] as parameters.

Needless to say, [the phase current peak value Ip] corresponds to the phase current peak value Ip detected in the phase current peak value and electrical angle detection unit 19. [The induced voltage electrical angle θe–the phase current electrical angle θi] corresponds to a value obtained by subtracting the phase current electrical angle θi detected in the phase current peak value and electrical angle detection unit 19 from the induced voltage electrical angle θe detected in the induced voltage peak value and electrical angle detection unit 20.

(4) The Method of Generating the Data Table Used when Detecting the Rotor Position θm in the Rotor Position Detection Unit 21

Figure 4:
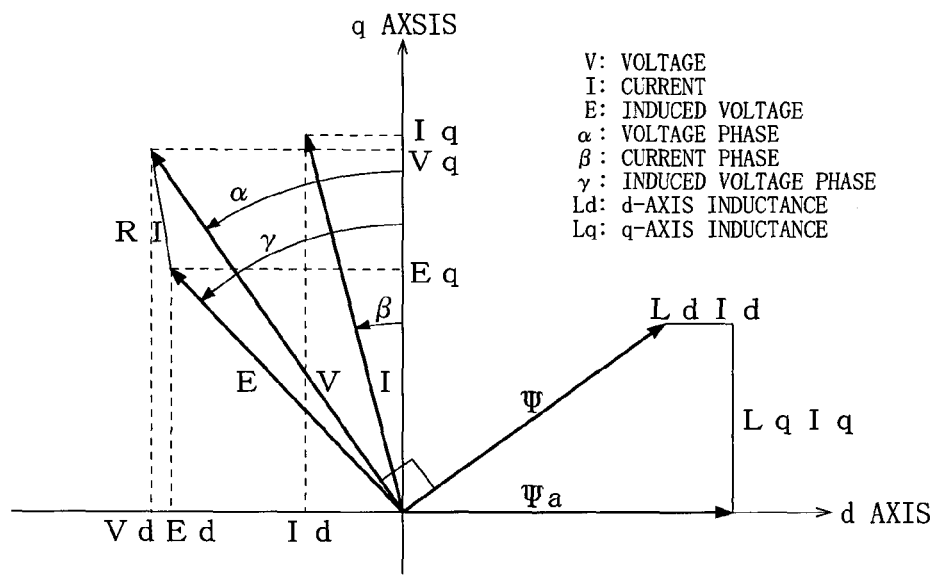
FIG. 4 is an explanatory drawing of a method of generating a data table used when detecting a rotor position in a rotor position detection unit illustrated FIG. 1.

FIG. 4 is a motor vector diagram when the rotor of the synchronous motor 11 is rotating. The relation among a voltage V, a current I, and an induced voltage E ($=\omega\Psi$) is expressed by vector in a d-q coordinate. In the figure, reference character Vd denotes a d-axis component of the voltage V, reference character Vq denotes a q-axis component of the voltage V, reference character Id denotes a d-axis component of the current I, reference character Iq denotes a q-axis component of the current I, Ed denotes a d-axis component of the induced voltage E, reference character Eq denotes a q-axis component of the induced voltage E, reference character α denotes a voltage phase on the basis of the q-axis, reference character β denotes a current phase on the basis of the q-axis, and reference character γ denotes an induced voltage phase on the basis of the q-axis. Further, in the figure, reference character Ψa denotes a permanent magnet flux of the rotor, reference character Ld denotes a d-axis inductance, reference character Lq denotes a q-axis inductance, reference character R denotes a resistance of a coil of the stator, and reference character Ψ denotes a total interlinkage magnetic flux of the rotor.

In the motor vector diagram, if rotational frequency of the rotor is ω, the following expression is held.

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \Psi a \end{pmatrix} \quad \text{[Expression 1]}$$

When ω-related values are moved from the right-hand side to the left-hand side in the above expression, the following expression is held.

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Ld & 0 \end{pmatrix} \begin{pmatrix} Id \\ Iq \end{pmatrix} + \begin{pmatrix} 0 \\ \Psi a \end{pmatrix} \quad \text{[Expression 2]}$$

The data table used when detecting the rotor position θm in the rotor position detection unit 21 is generated on the assumption that the above expressions are satisfied under the motor vector diagram. The generation of the data table is carried out by storing the current phase β when [the induced voltage phase γ–the current phase β] reaches a predetermined value while the current phase β and the current I illustrated in the motor vector diagram are respectively increased in incremental steps in a predetermined range; and making up a data table of the current phase β that has [the phase current peak value Ip] corresponding to [the current I] and [the induced voltage electrical angle θe–the phase current electrical angle θi] corresponding to [the induced voltage phase γ–the current phase β] as parameters.

Figure 5:
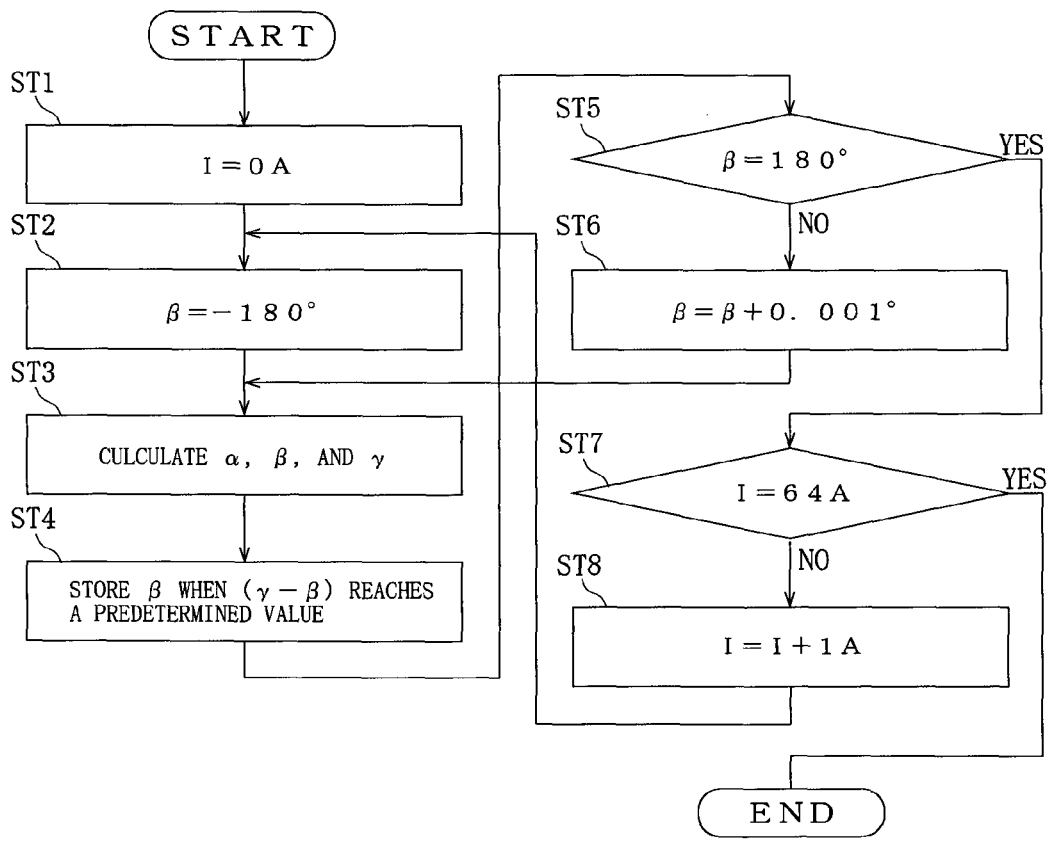
FIG. 5 is an explanatory drawing of a method of generating a data table used when detecting a rotor position in a rotor position detection unit illustrated FIG. 1.

More specifically, as illustrated in FIG. 5, while the current phase β is increased by 0.001° from −180° to 180° and the current I is increased by 1 A from 0 A to 64 A (see steps ST1, ST2, and ST5 to ST8), the voltage phase α, the current phase β, and the induced voltage phase γ from the motor vector diagram are found by the use of the d-axis inductance Ld and q-axis inductance Lq specific to the synchronous motor 11. Then, the current phase β when [the induced voltage phase γ–the current phase β] reaches 1°, 2°, 3°, . . . is stored (see steps ST3 and ST4). Thus, the data table of the current phase β, that has [the phase current peak value Ip] corresponding to [the current I] as a parameter and [the induced voltage electrical angle θe–the phase current electrical angle θi] corresponding to [the induced voltage phase γ–the current phase β] as another parameter, is generated.

Other methods can be used as aforementioned (3) the method of detecting the rotor position θm in the rotor position detection unit 21 and (4) the method of generating the data table used when detecting the rotor position θm in the rotor position detection unit 21. Thereinafter, details about the other methods are described in sequence.

(3') Another Method of Detecting the Rotor Position θm in the Rotor Position Detection Unit 21

The rotor position detection unit 21 detects the rotor position θm by finding the rotor position θm from the following expression by the use of the induced voltage electrical angle θe detected in the induced voltage peak value and electrical angle detection unit 20 and the induced voltage phase γ selected from a predefined data table (see the later described method in (4')).

$$\theta m = \theta e - \gamma - 90°$$

The data table used here specifies the induced voltage phase γ by [the phase current peak value Ip] and [the induced voltage electrical angle θe–the phase current electrical angle θi] as parameters. The desired induced voltage phase γ can be selected using [the phase current peak value Ip] and [the induced voltage electrical angle θe–the phase current electrical angle θi] as the parameters.

Needless to say, [the phase current peak value Ip] corresponds to the phase current peak value Ip detected in the phase current peak value and electrical angle detection unit 19. [The induced voltage electrical angle θe–the phase current electrical angle θi] corresponds to a value obtained by subtracting the phase current electrical angle θi detected in the phase current peak value and electrical angle detection unit 19 from the induced voltage electrical angle θe detected in the induced voltage peak value and electrical angle detection unit 20.

(4') Another Method of Generating the Data Table Used when Detecting the Rotor Position θm in the Rotor Position Detection Unit 21

The data table used when detecting the rotor position θm by the rotor position detection unit 21 is generated on the assumption that the above expressions are satisfied under the motor vector diagram as well as the method in (4). The generation of the data table is carried out by storing the induced voltage phase γ when [the induced voltage phase γ–the current phase β] reaches a predetermined value while the current phase β and the current I illustrated in the motor vector diagram are respectively increased in incremental steps in a predetermined range; and making up a data table of the induced voltage phase γ that has [the phase current peak value Ip] corresponding to [the current I] and [the induced voltage electrical angle θe–the phase current electrical angle θi] corresponding to [the induced voltage phase γ–the current phase β] as parameters.

More specifically, in the same manner as illustrated in FIG. 5, while the current phase β is increased by 0.001° from −180° to 180° and the current I is increased by 1 A from 0 A to 64 A (see steps ST1, ST2, and ST5 to ST8), the voltage phase α, the current phase β, and the induced voltage phase γ from the motor vector diagram are found by the use of the d-axis inductance Ld and the q-axis inductance Lq specific to the synchronous motor 11. Then, the induced voltage phase γ when [the induced voltage phase γ–the current phase β] reaches 1°, 2°, 3° . . . is stored (see steps ST3 and ST4). Thus, the data table of the induced voltage phase γ, that has [the phase current peak value Ip] corresponding to [the current I] as a parameter and [the induced voltage electrical angle θe–the phase current electrical angle θi] corresponding to [the induced voltage phase γ–the current phase β] as another parameter, is generated.

According to the aforementioned motor control device can detect the rotor position θm by directly finding the rotor position θm from the rotor position expression (θm=θi−β−

90°) containing, as the variable, the current electrical angle θi from among the phase current peak value Ip and the phase current electrical angle θi detected in the phase current peak value and electrical angle detection unit 19 and the induced voltage peak value Ep and the induced voltage electrical angle θe detected in the induced voltage peak value and electrical angle detection unit 20, and containing, as the variable, the current phase β capable of being selected using [the phase current peak value Ip] and [the induced voltage electrical angle θe–the phase current electrical angle θi] as parameters from the predefined data table; or from the rotor position expression (θm=θe–γ–90°) containing, as the variable, the induced voltage electrical angle θe, and containing, as the variable, the induced voltage phase γ capable of being selected using [the phase current peak value Ip] and [the induced voltage electrical angle θe–the phase current electrical angle θi] as parameters from the predefined data table.

Briefly, the rotor position θm is directly found by the use of the predetermined rotor position expression. Thus, the rotor position θm can be reliably detected under a certain accuracy contrary to the conventional detection method involving variation in detection accuracy. In addition, the use of a system for selecting the current phase β or the induced voltage phase γ which is one of the variables contained in the rotor expression from the predefined data table. Thus, the rotor position θm can be simply detected under a lower processing load than the system for finding the current phase β or the induced voltage phase γ every time, there is no need to use a high performance data processing apparatus corresponding to a high processing load that used in the conventional detection method.

By the way, in the aforementioned explanation, the data table which specifies the current phase β by [the phase current peak value Ip] and [the induced voltage electrical angle θe–the phase current electrical angle θi] as parameters as the data table used when detecting the rotor position θm in the rotor position detection unit 21. However, if a data table which specifies the current phase β or the induced voltage phase γ by [the induced voltage peak value Ep] and [the induced voltage electrical angle θe–the phase current electrical angle θi] as parameters, a data table which specifies the current phase β or the induced voltage phase γ by [the phase current peak value Ip] and [the induced voltage peak value Ep] as parameters, or a data table which specifies the current phase β or the induced voltage phase γ by [the phase current peak value Ip], [the induced voltage peak value Ep], and [the induced voltage electrical angle θe–the phase current electrical angle θi] as parameters is used in place of the above data table, functions and effects equivalent with the above functions and the above effects can exert.

Further, in the aforementioned explanation, the three-phase DC brushless motor as the synchronous motor 11 and the three-phase bipolar drive inverter as the inverter 12 are exemplified. However, if the motor control device has an inverter for a synchronous motor other than three-phase, functions and effects equivalent with the above functions and the above effects can exert by using the present invention.

Further, in the aforementioned explanation, the motor control device having the shunt resistors R1, R2, and R3 serves as the sensor for detecting the current flowing through each phase of the synchronous motor 11 arranged in the inverter 12 is exemplified. However, if the shunt resistors R1, R2, and R3 are arranged outside the inverter 12, or sensors (for example, sensors or the like utilizing a current transformer or a hole element) playing the role of the shunt resistors R1, R2, and R3 are arranged in the same position or other positions, functions and effects equivalent with the above functions and the above effects can exert by using the present invention.

Furthermore, in the aforementioned explanation, the motor control device connecting the branch lines from each of the connection lines between the synchronous motor 11 and the inverter 12 to the applied voltage detection unit 18 for detecting the voltages applied to each phase of the synchronous motor 11 is exemplified. However, if the voltages applied to each phase of the synchronous motor 11 are detected by finding from the voltage of the direct current power source 13 and the on-off amount of the switching devices of the inverter 12 and so on, functions and effects equivalent with the above functions and the above effects can exert by using the present invention.

INDUSTRIAL APPLICABILITY

The present invention is suitable for a motor control device having a function of detecting a rotor rotational position (hereinafter referred to as a rotor position) of a synchronous motor) of a synchronous motor without a sensor.

EXPLANATION OF LETTERS OR NUMERALS

11 . . . Synchronous motor, 12 . . . Inverter, 13 . . . Direct current power source, 14 . . . Controller, 15 . . . Rotation control unit, 16 . . . Inverter drive unit, 17 . . . Phase current detection unit, 18 . . . Applied voltage detection unit, 19 . . . Phase current peak value and electrical angle detection unit, 20 . . . Induced voltage peak value and electrical angle detection unit, 21 . . . Rotor position detection unit

The invention claimed is:

1. A motor control device having a function of detecting a rotor position of a synchronous motor without a sensor, wherein the motor control device comprises:
   current detecting means for detecting a current flowing through a coil of the synchronous motor;
   applied voltage detecting means for detecting an applied voltage applied to the coil of the synchronous motor;
   current peak value and electrical angle detecting means for detecting a current peak value and a current electrical angle on the basis of the current detected in the current detecting means;
   induced voltage peak value and electrical angle detecting means for detecting an induced voltage peak value and an induced voltage electrical angle on the basis of the current detected in the current detecting means and the applied voltage detected in the applied voltage detecting means; and
   rotor position detecting means for detecting the rotor position by directly finding the rotor position from a rotor position expression containing, as a variable, the current electrical angle or the induced voltage electrical angle from among the current peak value and the current electrical angle detected in the current peak value and electrical angle detecting means and the induced voltage peak value and the induced voltage electrical angle detected in the induced voltage peak value and electrical angle detecting means, and containing, as a variable, a current phase or an induced voltage phase capable of being selected using at least two of (a) the current peak value, (b) the induced voltage peak value and (c) the induced voltage electrical angle less the current electrical angle as parameters from a predefined data table.

2. The motor control device according to claim 1, wherein the predefined data table used in the rotor position detecting means specifies the current phase or the induced voltage phase by (a) the current peak value and (c) the induced voltage electrical angle less the current electrical angle) as the parameters.

3. The motor control device according to claim 2, wherein the rotor position expression in the rotor position detecting means is:

the rotor position equals the current electrical angle less the current phase less 90°, and the current phase in the rotor position expression is selected from the predefined data table using (a) the current peak value and (c) the induced voltage electrical angle less the current electrical angle as parameters.

4. The motor control device according to claim 2, wherein the rotor position expression in the rotor position detecting means is the rotor position equals the induced voltage electrical angle less the induced voltage phase less 90°, and the induced voltage phase in the rotor position expression is selected from the predefined data table using (a) the current peak value and (c) the induced voltage electrical angle less the current electrical angle as parameters.

5. The motor control device according to claim 1, wherein the synchronous motor is a synchronous motor having a stator with a plurality of phase coils;

the current detecting means detects currents flowing through each of the plurality of phase coils of the synchronous motor; and the applied voltage detecting means detects voltages applied to each of the plurality of phase coils of the synchronous motor.

* * * * *